Jan. 31, 1939.　　　　　G. MUFFLY　　　　　2,145,775
REFRIGERATING MECHANISM
Filed July 30, 1934　　　　7 Sheets-Sheet 1
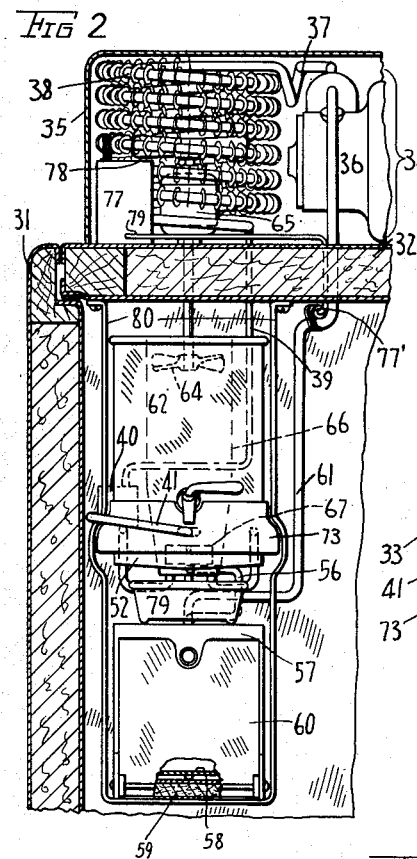
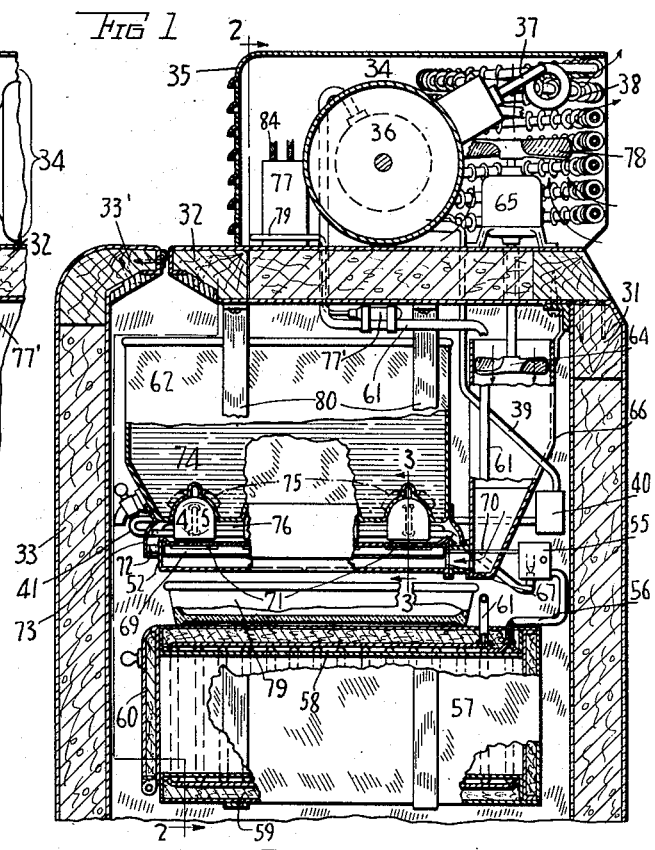
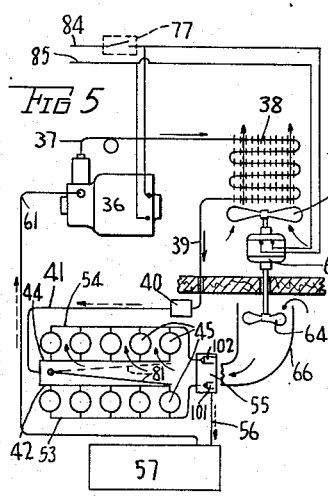
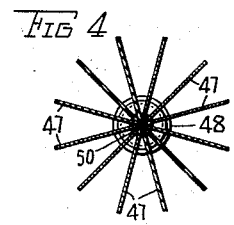
INVENTOR.
GLENN MUFFLY
BY
*Barnes, Dickey, Pierce & Hann*
ATTORNEYS.

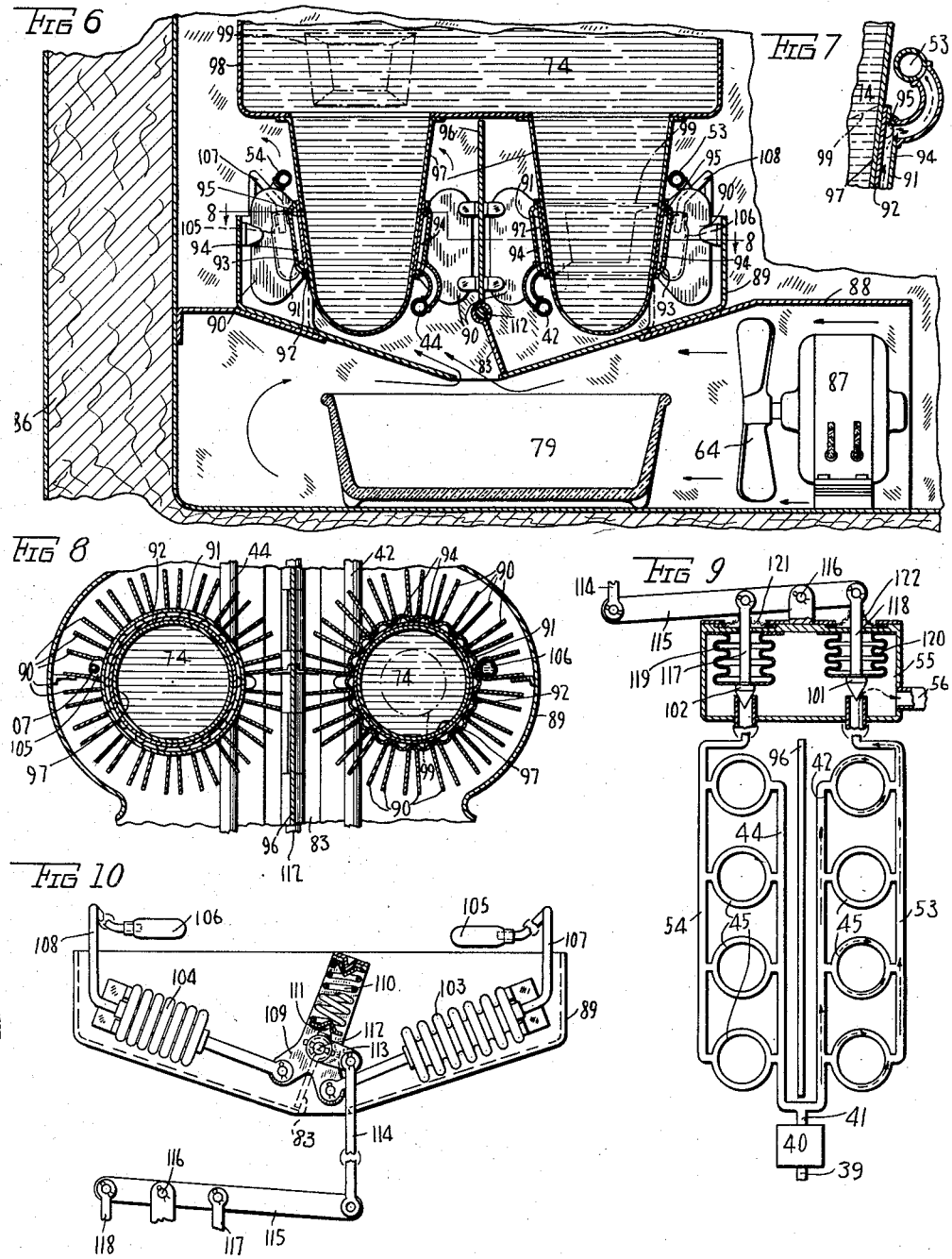

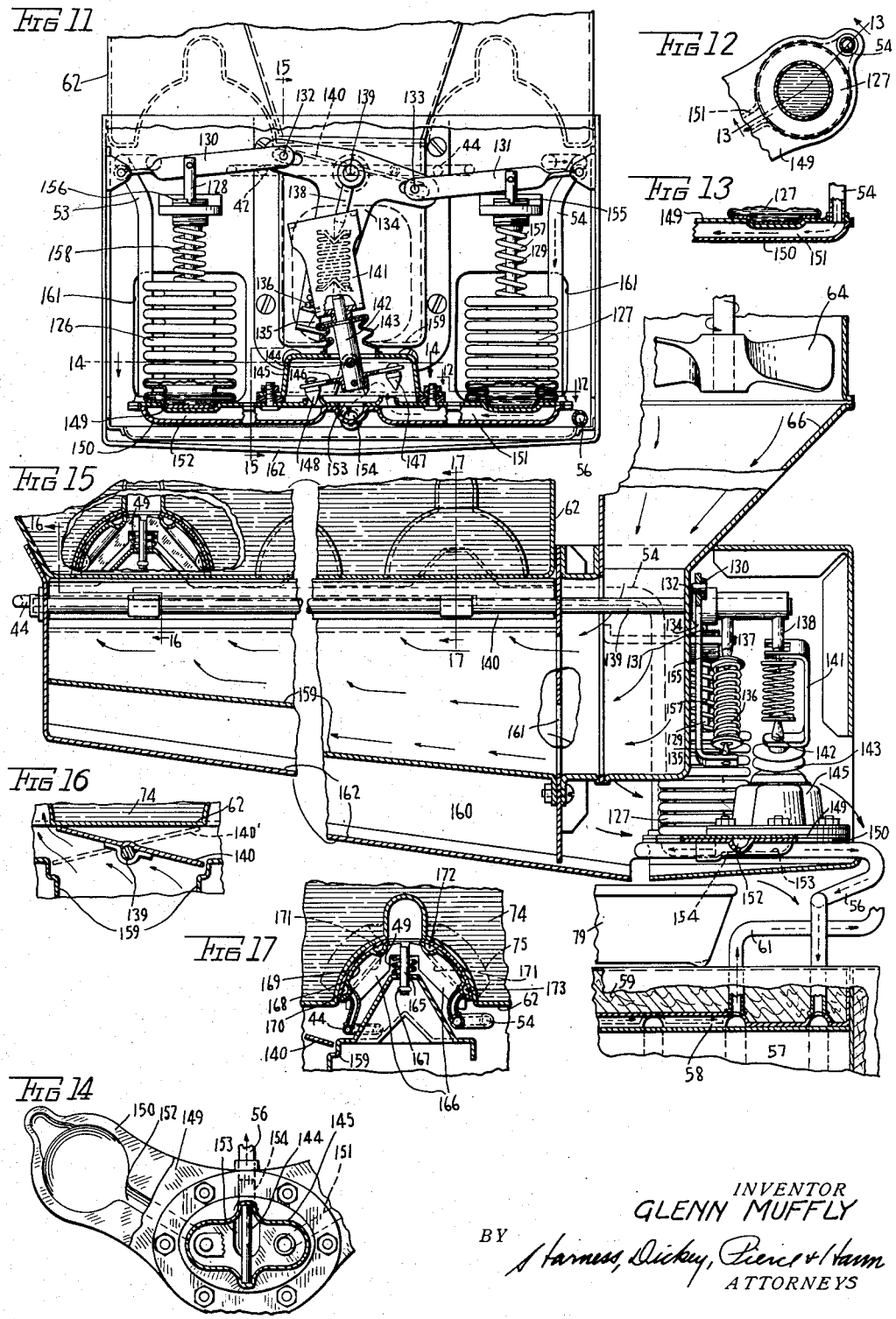

Jan. 31, 1939.    G. MUFFLY    2,145,775
REFRIGERATING MECHANISM
Filed July 30, 1934    7 Sheets-Sheet 4
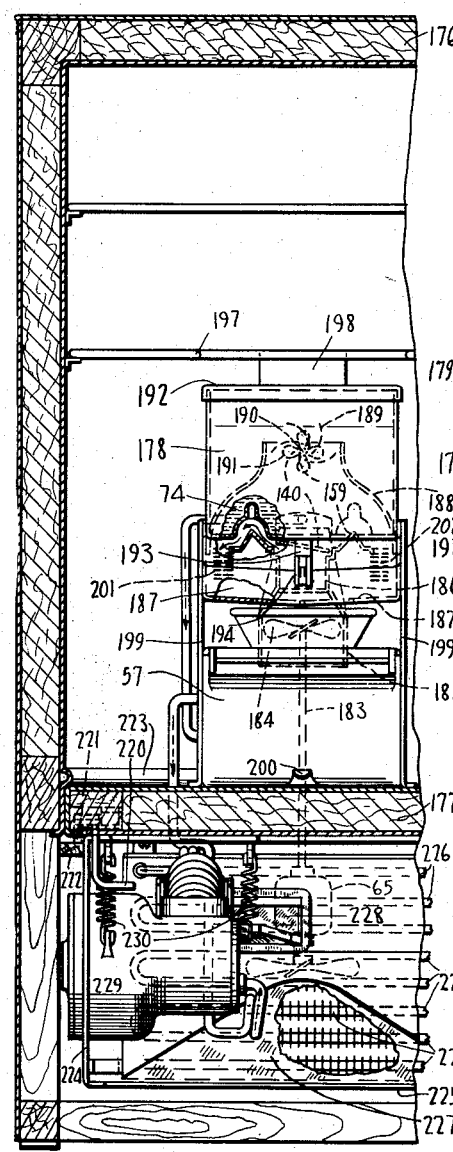
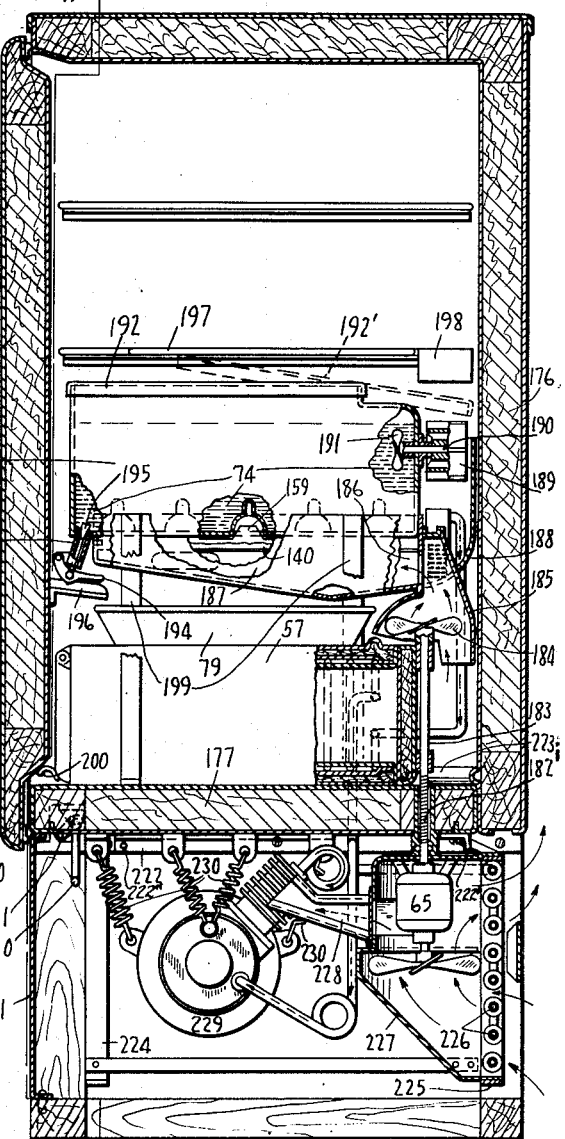
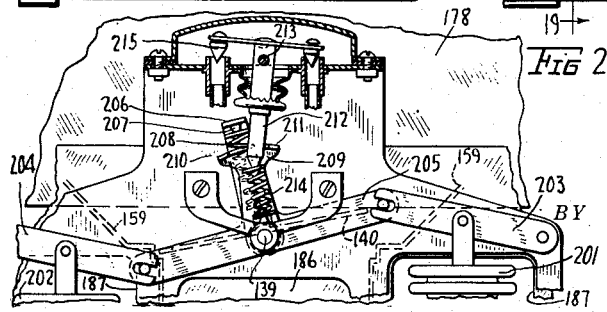
INVENTOR
GLENN MUFFLY
ATTORNEYS

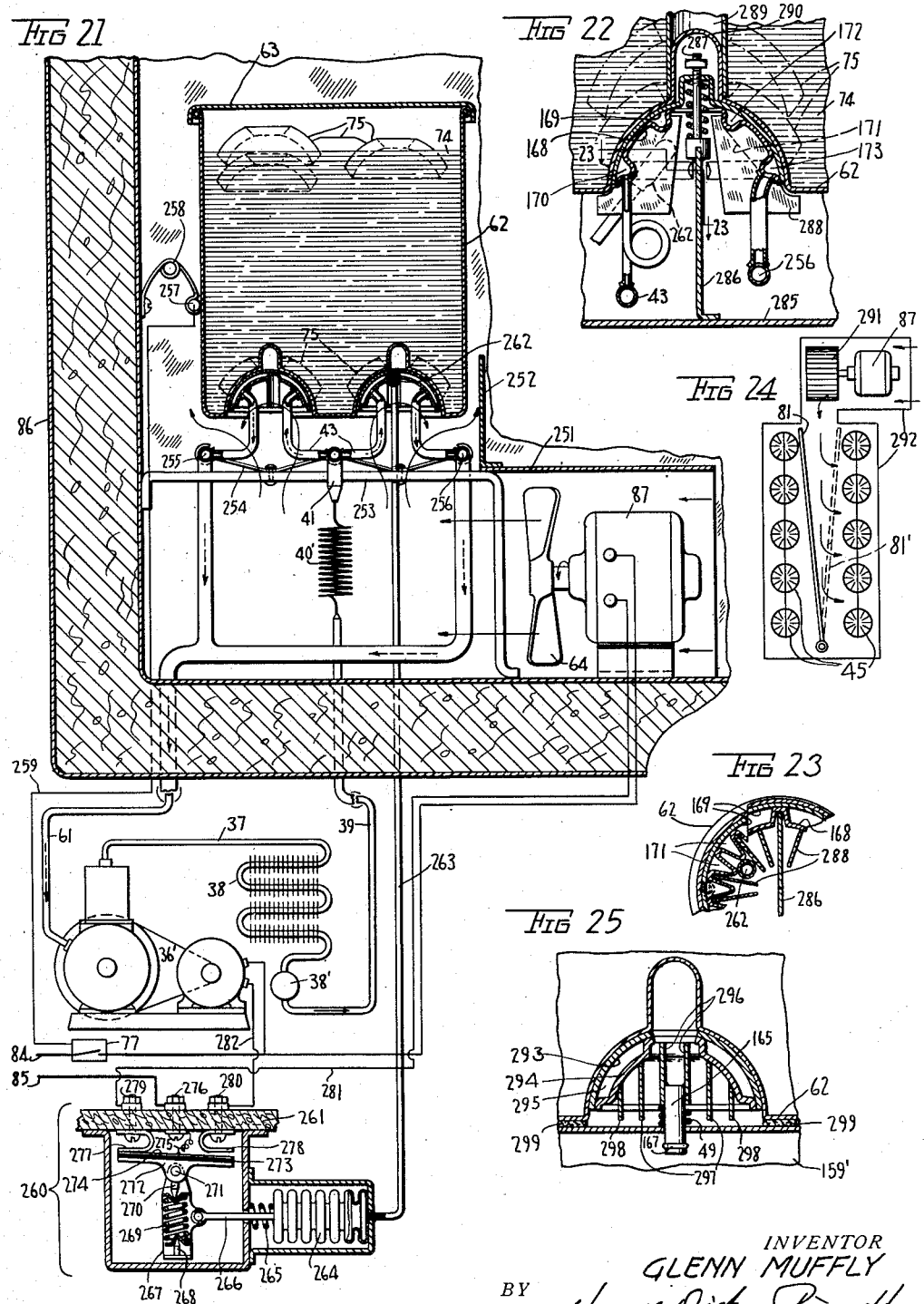

Jan. 31, 1939.  G. MUFFLY  2,145,775
REFRIGERATING MECHANISM
Filed July 30, 1934  7 Sheets-Sheet 6
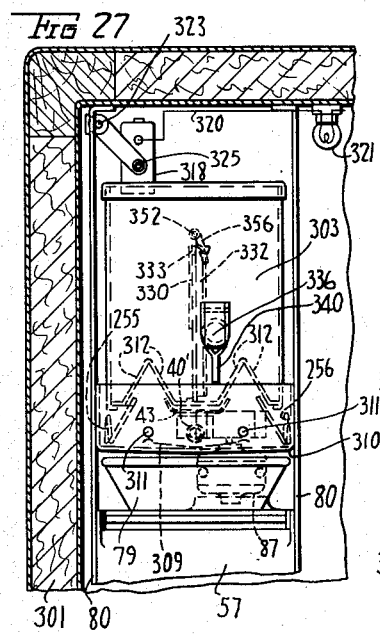
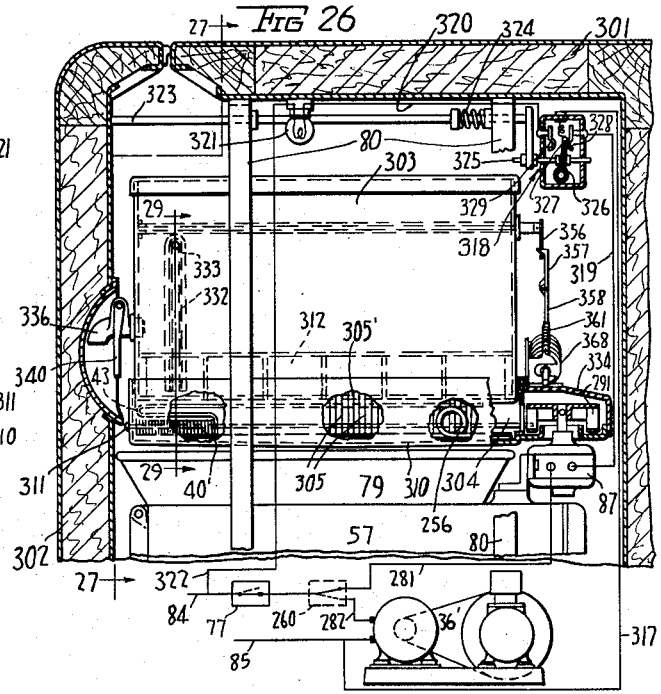
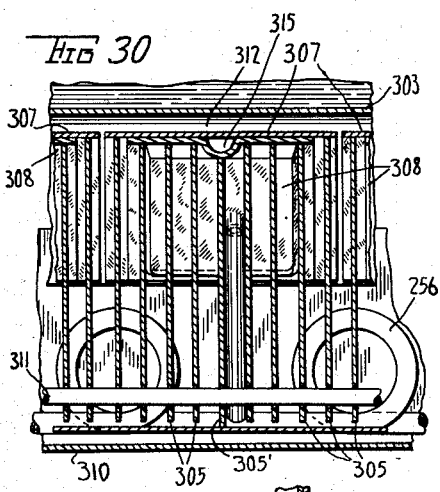
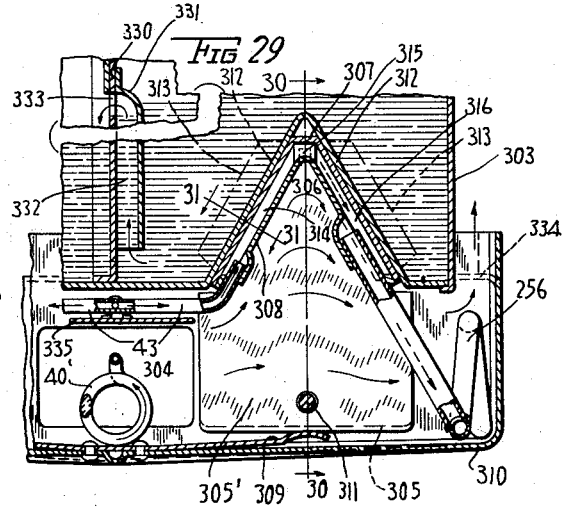
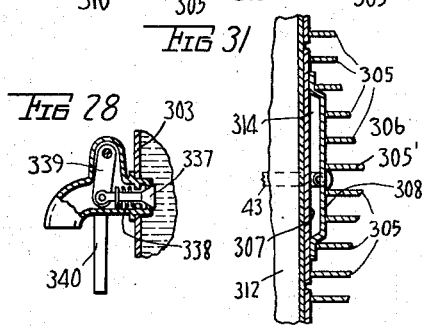
INVENTOR
GLENN MUFFLY
BY Harness, Dickey, Pierce + Hann
ATTORNEYS

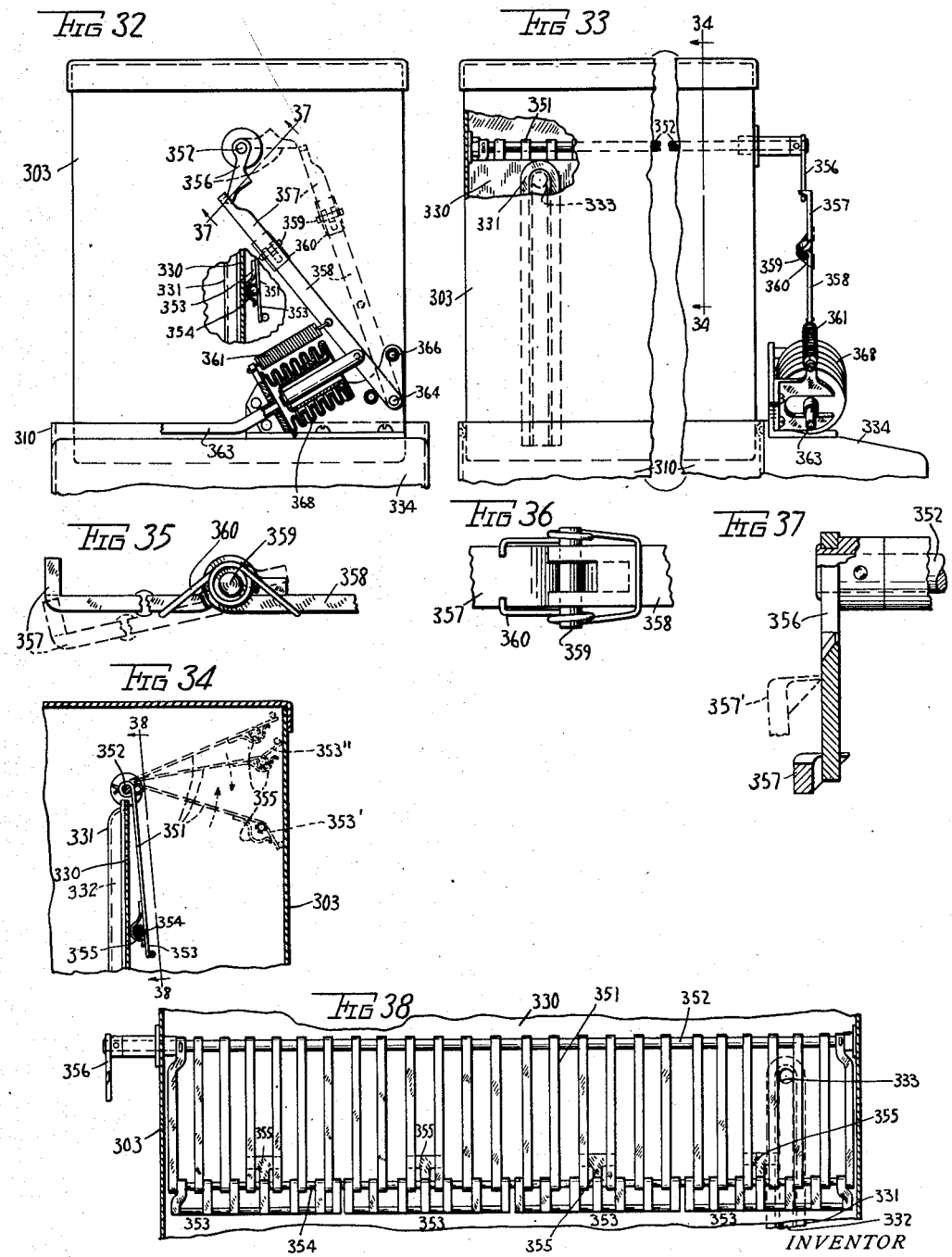

Patented Jan. 31, 1939

2,145,775

UNITED STATES PATENT OFFICE 2,145,775

REFRIGERATING MECHANISM

Glenn Muffly, Springfield, Ohio

Application July 30, 1934, Serial No. 737,485

34 Claims. (Cl. 62—105)

This invention relates to improvements in ice-making apparatus of the general type disclosed in my co-pending applications for Letters Patent of the United States, Serial Number 697,124, filed November 8, 1933, and Serial Number 719,099, filed April 5, 1934.

More specifically it relates to such apparatus in which the ice, after having been frozen upon a submerged surface, is freed from that surface by means of heat transfer from air circulated mechanically and to control means for such apparatus. In this connection, however, it will be understood that the means herein disclosed may be used either in conjunction with or independently of the general type of mechanisms disclosed in the above referred to prior applications.

An object of the present invention is to provide better means for heat transfer from the air in a refrigerator cabinet to the outer walls of a water tank therein at areas in registry with the inner surfaces upon which ice has been frozen, thus expediting the freeing of ice from such surfaces by melting.

A further object is to provide automatic control means in a refrigerator cabinet for simultaneously actuating refrigerant control valves and air control means to direct the flow of air over parts that are not being refrigerated.

A still further object is to so control air movement in a refrigerator cabinet that the cold parts exposed to cabinet air are completely defrosted at each cycle of the ice-making apparatus, thus preventing the accumulation of frost on same and avoiding the necessity for periodically shutting the refrigerating system down for defrosting purposes.

An additional object is to provide spherical mating surfaces of refrigerating elements and water tank surfaces with flexible supporting means so that each refrigerating element will be held in good thermal contact with its mating freezing area of the tank wall to produce ice of uniform thickness and to melt ice free from each of the surfaces in approximately the same length of time.

Another object is to provide automatic means employing power that is already available as a by-product of the operation of the system for lifting ice above the water level in the tank for the purpose of making it more readily accessible for removal and of dumping ice into another container so that purified water and ice may be separated from that which is less pure.

Still another object is to provide for the convenient removal of the refrigerating system from the cabinet in which it is installed.

Another additional object is to so direct the air circulation in a refrigerator cabinet that the air temperature is kept nearly uniform and the direction of air flow will be such as to minimize the dehydration of food-stuffs stored in the cabinet by causing the air to flow upwardly against the bottoms of dishes while in its most rapid movement after leaving the spaces within which it is cooled.

The above being among the objects of the present invention, the same consists of certain novel features of construction, combination of parts and steps of operation to be hereinafter described with reference to the accompanying drawings, and then claimed, having the above and other objects in view.

In the accompanying drawings which illustrate suitable embodiments of the present invention, and in which like numerals refer to like parts throughout the several different views, Figure 1 is a fragmentary, partially broken, vertical sectional view taken through a refrigerator cabinet in a plane parallel to a side wall thereof, a refrigerating system embodying features of the present invention being shown installed therein.

Fig. 2 is a fragmentary, transverse sectional view taken on the line 2—2 of Fig. 1.

Fig. 3 is a fragmentary, sectional view taken on the line 3—3 of Fig. 1.

Fig. 4 is a fragmentary, horizontal sectional view taken on the line 4—4 of Fig. 3.

Fig. 5 is a more or less diagrammatic view of the refrigerating system shown in the previous figures, illustrating the refrigerant circuit and wiring diagram.

Fig. 6 is a fragmentary, partially broken, vertical sectional view taken through a refrigerating cabinet having a modified form of tank, evaporator and fan arrangement.

Fig. 7 is a fragmentary sectional view showing one of the refrigerant manifold connections for the construction shown in Fig. 6.

Fig. 8 is a fragmentary, horizontal sectional view taken on the line 8—8 of Fig. 6, showing how fins are attached to the vertically corrugated outer wall of the evaporator unit and how a control bulb is secured between these fins, as well as how a baffle is arranged to direct air flow over the fins.

Fig. 9 is a partly diagrammatic and partly sectioned view of evaporator and control valves such as might be used in the systems illustrated by previous views.

Fig. 10 is a rear elevational view of part of the mechanism shown in Fig. 6, showing the air baffle and parts of the control mechanism.

Fig. 11 is a rear elevation, partly in section, of valve and shutter operating mechanism performing the same functions as that shown in Fig. 10, but with a different arrangement of parts and shown in connection with a water tank and evaporator more like Figs. 1, 18, 19 and 20.

Fig. 12 is a fragmentary sectional view taken on the line 12—12 of Fig. 11, showing a horizontal section of the bellows.

Fig. 13 is a fragmentary vertical sectional view taken through Fig. 12 on the line 13—13 thereof, showing a section of the evaporator passage thermally associated with the bellows 127.

Fig. 14 is a fragmentary horizontal sectional view taken on the line 14—14 of Fig. 11, showing valve ports and part of the refrigerant path.

Fig. 15 is a broken vertical sectional view taken on the line 15—15 of Fig. 11, showing air circulation means and part of the valve and shutter control mechanism.

Fig. 16 is a fragmentary sectional view taken on the line 16—16 of Fig. 15, showing the shutter and its shaft.

Fig. 17 is a fragmentary vertical sectional view of one of the evaporator units of Fig. 15, taken on the line 17—17 thereof.

Fig. 18 is a vertical sectional view of a refrigerator cabinet and refrigerating system, showing the system removably mounted in a cabinet, as in Fig. 1, but modified by placing the condensing unit below the food compartment and making the bottom insulated wall removable with the system instead of the top wall as in Fig. 1.

Fig. 19 is a vertical sectional view, partly broken away, of the cabinet and system shown in Fig. 18, and taken on the line 19—19 thereof.

Fig. 20 is an enlarged, partially broken, partially sectioned, rear view of the construction shown in Fig. 19, showing details of the valve and shutter mechanism.

Fig. 21 is a view similar to Fig. 6, but including a partly diagrammatic representation of the refrigerating system and control means with a modified refrigerant circuit and cycle of operation.

Fig. 22 is an enlarged sectional view of a portion of an ice-water tank and an evaporator unit such as might be employed in one of the systems shown in the previous views, but showing in addition a guiding tube centrally attached to an ice-forming portion of the tank for the purpose of guiding freed ice rings so that the lower rings will provide buoyant lift to raise the upper rings above the water level in the tank for easy accessibility.

Fig. 23 is a fragmentary horizontal sectional view taken on the line 23—23 of Fig. 22.

Fig. 24 is a diagrammatic view of a dual set of evaporator elements such as are shown in Fig. 22, showing modified forms of air shutter and fan.

Fig. 25 is a sectional view taken axially through an evaporator unit somewhat similar to the one shown in Fig. 17, but taken in a plane at right angle thereto, showing a modified form of baffle 159', differing somewhat from baffle 159 in Fig. 17.

Fig. 26 is a fragmentary, partially broken vertical sectional view of a modified form of refrigerator cabinet and mechanism therefor, showing the condensing unit and connections diagrammatically.

Fig. 27 is a fragmentary sectional view taken on the line 27—27 of Fig. 26.

Fig. 28 is an enlarged, fragmentary, partially broken, partially sectioned view particularly showing details of the faucet 336 seen in Fig. 26.

Fig. 29 is an enlarged transverse sectional view taken on the line 29—29 of Fig. 26, showing a portion of the water tank and one evaporator unit with part of the baffle.

Fig. 30 is a fragmentary sectional view taken on line 30—30 of Fig. 29.

Fig. 31 is a fragmentary sectional view taken on line 31—31 of Fig. 29.

Fig. 32 is a partially broken, partially sectioned view of the water and ice tank shown in Figs. 26 and 27, looking at the rear thereof and showing the ice-lifting mechanism.

Fig. 33 is a partially broken side elevational view of the parts shown in Fig. 32.

Fig. 34 is a fragmentary sectional view taken on the line 34—34 of Fig. 33.

Fig. 35 is an enlarged, fragmentary, partially broken view of the ice lifter actuating lever shown in Figs. 32 and 33, showing in greater detail the spring hinge thereof.

Fig. 36 is a fragmentary plan view of the spring hinge shown in Fig. 35.

Fig. 37 is a fragmentary, partially broken, partially sectioned view of the co-acting levers 356 and 357, which operate the ice-lifting rack shown in Figs. 32 and 33.

Fig. 38 is a fragmentary sectional view taken on the line 38—38 of Fig. 34, showing the ice-lifting rack in the tank.

Referring to Fig. 1, a refrigerator cabinet is indicated at 31 fitted with a removable top wall 32, upon the upper side of which a condensing unit assembly 34 is supported, while the low-side or heat absorbing portion of the system is supported upon the lower side of wall 32.

The door 33 of cabinet 31 is formed with an inwardly projecting inverted L portion 33', which fits against the wall 32. When the door is opened the wall 32 may be withdrawn in a horizontal, forward, direction, after release of a suitable catch or lock (not shown) which normally holds this wall and the parts supported by it in place.

The condensing unit 34 includes the motor-compressor unit 36, the condenser 38 and related parts hereinafter described and is protected by the separately removable hood 35. The path of volatile refrigerant circulated by the system, starting with the compressor, where the gaseous refrigerant is compressed, leads through the tube 37 to the condenser 38, where it is condensed, through the liquid tube 39 to the expansion valve or other suitable pressure-reducing device 40. From this point the refrigerant flows at reduced pressure through the low pressure liquid line 41 to a manifold 42 (Figs. 5, 6 and 9) connected with part of the plurality of evaporator units 45, which are arranged in two groups, as indicated in Figs. 5 and 9, where a part of the refrigerant vaporizes, and thence through tubular manifold 53 to the valve assembly 55, through the tube 56 to evaporator 58 of sharp freezer 57, from which the vaporized refrigerant returns though tube 61 to the motor compressor unit 36, thus completing its circuit.

Referring to Fig. 3 it will be seen that the evaporator unit 45 comprises an annular chamber 46 in which part of the refrigerant evaporates before it passes out to the manifold 53 or 54. Heat-absorbing fins 47 are attached in heat-conductive relation on the exterior surface of the walls of the chamber 46 and are secured to the cup-like hub 48, which acts as a retainer for spring 49 which supports the weight of evaporator unit 45 and a portion of the ice water tank 62. The screw 50 is threaded into the nut 51, which is welded or otherwise secured in cup 48 to attach the evaporator unit 45 to the support 52 so that it may rock thereon. The length of screw 50 and the space between fins 47 are such that the screw, after passing through the nut 51 and the cup 48 engages and slightly bends one or more of the fins 47 in such a manner that the fin or fins act as a locking means to prevent the loosening of the screw 50 after it has been screwed in to the desired position. This relation may be seen in Fig. 4.

When the tank 62 is placed upon the evaporator units 45, which are its sole support, the weight of the tank and any water and/or ice therein depress the various springs 49 while the evaporator units 45 are free to rock about their pivotal supports on member 52, thus insuring that all of the spherical outer surfaces of evaporator units 45 make good thermal contact with the mating partially spherical surfaces of the wall of tank 62 provided for engagement therewith. The tubes 42, 44, 53 and 54 which comprise the manifolds connecting the various units 45 are sufficiently flexible to allow each of the units to assume its correct position as to height and angle of axis to conform to the positions of the female hemispherical surfaces of the tank.

There is a dual need for this good thermal contact, first to insure good heat transfer from the tank wall to the evaporator unit for the purpose of freezing water within the tank, and second to provide good heat transfer from the fins 47 through the walls of evaporator space 46 to the same portion of the tank wall for the purpose of partially melting the ice that has been formed thereon to free it from the tank wall.

To assist in the melting of ice free from the surface upon which it has been frozen, I have provided a forced flow of air over the fins 47, which also assists in cooling the air within the refrigerator cabinet 31. Referring to Fig. 1, it will be seen that the fan 64, driven by the motor 65 located outside of the refrigerated space, forces a flow of air from the upper interior of the cabinet downward through the duct 66 and horizontally through the opening 67 to the chamber formed by support 52 and its bottom cover 68 (Fig. 3).

Referring to Fig. 3 the path of air may be traced from this chamber through ports 71, which are uncovered by the movement of shutter 69 attached to shaft 70. The air passes over fins 47 and downward through passage 72 formed by shield 73, which also serves as a guide for the removable tank 62, preventing damage to the contact surfaces of evaporator units 45.

The shaft 70 and valve mechanism 55 are simultaneously actuated by thermal means, as will be hereinafter described, to cause air to be blown over the fins of one set of evaporator units 45 while refrigeration is produced in another set of evaporator units 45. Referring to Fig. 3 it is seen that the shutter 69 is positioned to allow air to flow over the fins of the evaporator units at the right hand side of the tank 62, (left hand side in Fig. 2), while the shutter stops air flow through the left hand ports 71 and over the left hand row of evaporator units (not shown in this view).

This position of the shutter is shown in Fig. 3 as having just been assumed, starting the process of melting free the ice rings 75 which have just been formed on the right hand side of the tank and starting the formation of ice on the left hand side of the tank. Air is stopped from flowing over fins on the freezing side by the shutter 69 and the wall 76. Valve mechanism 55 allows flow of refrigerant from only one side at a time, and this side is always the one in which air flow is stopped. The mechanism 55 for causing this cyclic operation will be described in more detail later.

In addition to the control of ice-making and ice-freeing cycles, the system may be provided with a conventional control 77 (see Fig. 1) for stopping and starting the motor-compressor unit. As shown in Figs. 1, 2 and 5 this control comprises a switch connected in series with the two motors, which are in parallel with each other. One motor, which is included in the unit 36, drives the compressor and the other, 65, drives the two fans 64 and 78, of which the latter is employed in cooling the condenser. As shown in Fig. 1 the fan 78 draws air in over the lower tubes of condenser 38 and discharges air over the upper tubes, providing a counterflow condition.

The thermostat 77 may be actuated by temperature or pressure changes in any of the usual ways, but is here shown in Fig. 1 and Fig. 2 as being actuated by changes of temperature of the bulb 77' which is connected to the control by means of the capillary tube 79 and is exposed to temperature changes of both suction tube 61 and the air in cabinet 31.

The sharp freezer 57 comprises the evaporator element 58 (Fig. 1) enclosed by the insulated wall 59 and the insulated door 60, it being so constructed and arranged that no cold surface is exposed in a manner to collect dew or frost. Likewise the tube 56 and valve mechanism 55 are preferably insulated. The hangers 80 support the sharp freezer 57 and the shield 73, which in turn support the other parts of the low side or cold portion of the system, making the entire system removable with the insulated wall 32.

The shutter 69 might be replaced by a shutter pivoted on a vertical axis as shown more or less diagrammatically at 81 in Figs. 5 and 24. Directions of air flow are generally indicated by arrows. Refrigerant flow is indicated by solid arrows for high pressure vapor or liquid while dotted arrows are used to indicate flow of low pressure refrigerant, either vapor or liquid.

Electric current is supplied over power lines 84 and 85 of Figs. 5 and 21, leading to motors and control switches as required for the various methods of operation and control. While Fig. 9 is drawn particularly for the purpose of showing the operation of valves of Fig. 6, it is equally applicable to Figs. 1, 2, 3 and 5.

Referring to Fig. 6 a transverse sectional view of the lower part of the left side of cabinet 86 is shown, in which motor 87 drives fan 64, drawing air from the lower part of the cabinet into the housing 88, which, in combination with walls and door of the cabinet, provides an enclosed space serving as an air duct and as a location for the drip pan 79. From this enclosed space the air passes upward through one side of the baffle 89, as directed by the shutter 83, here shown in position to cause air to flow upward on the left side of partition 96.

The air passes over fins 90 (see Fig. 8) which are colder than the air of the cabinet, due to their intimate connection with the shells 91 and 92 which enclose the evaporator passages 93, 94 and 95. Inner shell 92 contacts the tapered outer surface of conical portion or cup 97 of ice and water tank 98. As shown in Fig. 6 the left hand row of cups 97 have been warmed by the air flow until ice rings 99 have melted free from the inner surface of cups 97 and are floating upward in the water 74, while similar ice rings 99 are nearing completion in the row of right hand cups 97, which are being refrigerated while cups 97 at the left are being warmed.

The shutter 83 and the valves shown in Fig. 9 are actuated simultaneously by the thermostatic device shown in Fig. 10 to cause refrigerant to stop flowing around the right hand row of cups and start flowing around the left hand row of cups at the same instant that the air flow is diverted from the left to the right side of the baffle pan 89. Figure 9 shows the valve 101 open and the valve 102 closed, which corresponds to the shutter position shown in Fig. 6, where refrigerant is flowing through manifolds 42 and 53, but not through 44 and 54.

Figure 10, which is a partial rear end view of Fig. 6 with the cabinet omitted, shows the shutter 83 in the same position as in Fig. 6, but it is represented by dotted lines, being hidden by the baffle pan 89. The two bellows 103 and 104, shown in Fig. 10, and the parts associated with them are here referred to as "right" and "left" with reference to the main view, Fig. 6, for convenience in explaining the operation, hence in referring to Fig. 10 the reader will follow the lettering instead of the position of the parts on the sheet.

Figure 10 shows left hand bellows 103 expanded nearly to its maximum length, which condition is caused by the warming up of bulb 105 (seen between the fins on the left side of Fig. 6). At the same time the right hand bulb 106 has been cooled until the volatile fluid contained therein has condensed, allowing bellows 104 to contract. A slight additional expansion of bellows 103 and a slight additional contraction of bellows 104 will move the forked arm 109 beyond the center line of point 111, which is attached to shaft 112, causing this shaft and the shutter 83 mounted thereon to move in a counter-clockwise direction as viewed in Fig. 10, which is clockwise in Fig. 6, so that shutter 83 is moved to the left in Fig. 6, diverting the flow of air to pass over the fins on the right hand side instead of the left hand side.

The arm 113, which is also attached to shaft 112, moves upward, causing rod 114 to also move upward, pivoting arm 115 on the rigidly supported pin 116 in an upward direction. This moves rod 117, which is also seen in Fig. 9, in a direction that opens valve 102 while rod 118 closes valve 101. The seating of valve 101 provides a stop for the movement of parts 118, 117, 115, 114, 113, 112, 111 and 83, since shutter 83 swings clear of baffle 89. The result is that refrigerant flow is diverted to the left side of Fig. 6 at the same instant that air flow is diverted to the right side.

Ice now starts to form in cups 97 on the left side of tank 98 while the ice rings already formed on the right hand side are melted free to permit them to float upward in the water. The timing of this cyclic operation may be established by the selection of suitable volatile fluid for charging the bulbs 105 and 106 partly full of liquid with vapor of the same fluid filling tubes 107 and 108 and bellows 103 and 104. The stiffness of spring 110 may also be varied to suit and if desired to provide means for adjustment by users or field service men the movement of each bellows in one direction may be opposed by an adjustable spring, according to well known practice illustrated in Fig. 11 of this application.

The rods 117 and 118 are secured in a gas-tight manner to the movable heads of bellows 119 and 120 respectively. The two bellows are made gas-tight with the housing of mechanism 55 and as a precaution against the formation of frost within the two bellows the flexible coverings 121 and 122 are employed to close the open end of the bellows against air circulation.

As will be seen in Fig. 8, the baffle 89 is formed with its vertical side walls curved inwardly between the cups 97 to confine the air circulation more closely to the vicinity of the fins 90. The motor 87 may be operated as described in connection with the motor 65 of Fig. 5, or this motor may be thermostatically started and stopped with co-incidental means for starting and stopping the motor which drives the compressor of the refrigerating system, as elsewhere herein described.

Figure 11 is a rear view of a control mechanism such as described, but modified as to application of expansive force to bellows and as to shutter arrangement. The bellows 126 is shown expanded to nearly its maximum under the influence of the draft of air which is being blown over it, causing the vaporization of part of the volatile fluid within the bellows. This expansion has pushed the rod 128 upward, moving the rocker arm 130, at the movable end of which the pin 132 engages the T shaped rocker 134, moving it in a clockwise direction as seen in Fig. 11.

This movement has carried the point 135 on arm 134 and the lower end of spring 136 into approximate alignment with point 137 (see Fig. 15) on which the upper end of spring 136 pivots. The cupped spring retainers at each end of the spring rock upon the points, holding the spring under constant compression. A slight further movement of rocker 134 will cause the pointed arm 137 to move with a snap action backward as seen in Fig. 15, which would be counter-clockwise in Fig. 11, where the point 137 is hidden behind point 138. These two pointed arms are rigidly secured together and to the shaft 139, which carries the air shutter 140, which is thus moved from the position shown to the dotted position 140' as seen in Fig. 16.

The movement of point 138, which engages after a slight movement with the forked arm 141, causes 141 and the pointed arm 142, to which it is attached, to pivot upon the fixed shaft 144 (Fig. 11), which is attached to valve housing cover 145. This movement also flexes the gas-tight bellows 143, which joins arm 142 and cover 145. The arm 142 is fixed to the valve rocker 146 and thus moves valve 147 to closed position and opening valve 148, the valve 147 engaging its seat in the wall 149 which also forms the bottom of the valve housing, seats for the two thermostatic bellows 126 and 127, and the upper wall of vapor passages 151, 152 and 154.

As shown in Fig. 11, bellows 127 is contracting under the combined effect of refrigeration on this half of the evaporator (particularly in the passage 151) and the force transmitted to it through rockers 130, 134 and 131 from the expanding bellows 126. Upon reversal of the shutter and the valves as above described the bellows 127 will be warmed by the blast of relatively warm air and the stoppage of refrigeration on that side, while bellows 126 will be cooled by the refrigeration taking place in passage 152. This will cause T rocker 134 to move in a counterclockwise direction as viewed in Fig. 11 preparatory to another reversal of the shutter and valves to the original position as shown.

Adjusting nuts 155 and 156, varying the compression of springs 157 and 158 upon bellows 127 and 126, may be employed to adjust for length of time allowed for freezing and for melting ice rings free on each side of the water tank 62.

As will be seen in Fig. 16, the shutter 140 is stopped in each direction by contact with the bottom of tank 62, which may vary somewhat in position with changes in weight of ice and water contained in it, since the weight of the tank and its contents is carried by the several springs 49, of which one is seen in Fig. 17. Air blown downward by the fan 64 through the duct 66 enters the enclosure between the baffle 159 and the shutter 140, passes over the fins of the evaporator units on one side of the tank, according to position of the shutter 140, and exits through one of the side return ducts 160 and one of the openings 161, which cause it to discharge over one of the bellows 126 or 127, from which point it is directed downward inside of the cabinet.

The drip shield 162, forming the bottom of return ducts 160, is arranged to catch drippage from all of the exposed cold parts and drain it into pan 79. With properly arranged parts and temperature relations it is possible to prevent the holding over of any frost on parts exposed outside of the insulated sharp freezer 57 from one cycle to the next. This makes the system inherently automatic as to defrosting and avoids the need for any special defrosting mechanism such as is often employed to remove frost at less frequent intervals of time. The tube 56, and if desired, the tube 61 may be insulated to prevent the collection of frost or moisture thereon at points which will not drain into the pan.

In Fig. 17 the baffle and support 159 is seen in section through one of the evaporator units. The spring 49 is here shown supporting the evaporator unit in the same manner as shown in Fig. 3, but with certain modifications of the evaporator unit and spring location to adapt these parts to the construction shown by Figs. 11 and 15.

The pin 165 replaces screw 50 (of Fig. 3) and is welded to the fins 166, which are in turn welded to the inner wall 168 of the evaporator unit. This wall 168 corresponds to outer wall 91 of Figs. 6, 7 and 8 in that it is the wall that does not contact the tank 62. Wall 168 is welded to the outer wall 169, which in this case is the wall contacting the tank 62. Pin 165 is a loose fit in a hole in baffle 159 and is prevented from lifting out of same by the snap ring 167, which fits into a groove in pin 165.

Low pressure liquid refrigerant entering the evaporator unit from the manifold 44 is free to flow something less than 90° around the base of the evaporator unit in either direction through passage 170 and upward through the passages 171 connected therewith to the circular passage 172 at the top of the evaporator unit, from which it flows downward through other similar passages 171 to the semi-circular passage 173 which is connected to the outlet manifold 54. Refrigerant is stopped from flowing around the base of the hemispherical evaporator unit directly from inlet to outlet by the fact that passages 170 and 173 are not connected except through their several passages 171 and the circular passage 172 at the top of the evaporator unit.

The fins 166 are attached to the wall 168 between the passages 171 where the walls 168 and 169 are welded, brazed or soldered together, thus providing good thermal conductivity from the fins to the outer wall 169 which is in contact with the tank. The principle is the same as that illustrated in Figs. 6 and 8, in that the fins are attached to the wall not contacting the tank, but along lines at which the two walls of the evaporator unit are fused together, thus providing good thermal conductivity from the fins to the wall of the evaporator unit which contacts the tank in registry with the inner tank wall area on which ice is frozen. This effect may be obtained in the construction shown in Fig. 3 by making the walls enclosing the annular evaporator space 46 quite thick, preferably of copper or other metal having a high thermal conductivity, so that heat is conducted from the fins through the walls to the surface that contacts the tank.

In Fig. 18 is shown a side elevation in section of a modified form of cabinet 176, having a removable bottom wall 177, on which are mounted all of the parts of the refrigerating system, the heat absorbing parts on the upper (inner) side of the removable insulated wall and the heat dissipating parts on the lower (outer) side of the wall. This arrangement allows certain desirable locations of parts and direction of air flow, as will be understood from the following description.

The ice and water tank 178 is supported upon flexibly mounted evaporator units as before described, but is located lower in the cabinet, so that ready access may be had for pouring water into the tank or removing ice therefrom without lifting the water and ice so high and without requiring the special form of cabinet door shown in Fig. 1. The door 179 is however slightly different from a conventional door in having along its lower edge the extended flange 180, which covers the front of the removable wall 177 and, if desired, the upper edge of door 181 which closes the front of the lower compartment in which are located the "high side" parts of the system.

The motor 65, corresponding to the motor of the same number in previous views, is located below the removable wall in Fig. 18 and drives the flexible shaft 182, which passes up through the removable wall to drive the solid shaft 183 on which is mounted the fan 184. This fan draws air upward from the bottom of the cabinet through air duct 185 and discharges it forwardly through the central air duct 186 between the evaporator units. From duct 186 the air is directed to one side by shutter 140 as shown in previous views to pass over fins of one set of evaporator units, after which it returns to the rear of the cabinet through one of the side ducts 187. As the air leaves the rear end of this duct 187 it passes over one of the bellows of the control mechanism shown in Fig. 20 and is directed upward by the baffle 188.

As the air leaves baffle 188 it turns air wheel 189, which is attached to shaft 190, on the opposite end of which is water screw 191, which agitates and causes circulation of water 74 in tank 178. The shaft 190 is supported in a suitable bearing of water-tight construction passing through the rear vertical wall of tank 178. This shaft together with air wheel 189 and water screw 191 are removable from the cabinet with the tank 178, since power is transmitted to the water screw 191 from the fan 184 by means of air without any mechanical connection.

The purpose of the water screw 191 is to produce a slight movement of water over the freezing surfaces to improve the clearness of the ice frozen thereon, and at the same time it serves to cause a forward flow of water and floating ice at the top of tank 178, causing ice to collect near the front of the tank, where it is easily removable by lifting the cover 192 and sliding it rearward to the position indicated by dotted lines at 192'.

This direction of air flow in the cabinet reverses the normal thermal flow of air, causing a more rapid air movement so that there is less temperature variation of air within the cabinet than is usual with thermal air circulation. With this small temperature difference the air will have less difference in its moisture content and will not rise to the usual high limit of temperature which causes the drop of relative humidity and the resulting dehydration of foods that occurs in ordinary mechanically refrigerated cabinets. The more rapid air movement is upward, striking the bottoms of containers instead of striking the food direct, which also acts to minimize the dehydration of foods stored in the cabinet.

The water faucet 193 at the front of tank 178 is opened by the lever 194, which is pushed upward by the drinking glass or other container into which water is to be drawn. The upward movement of lever 194 about its pivot at the front raises the valve member 195 from its seat. Any leakage of the faucet 193 is caught by the drip catcher 196 and directed into the drip pan 79.

The tank is removable by lifting off of the spring-supported evaporator units, as before described, without removing other parts of the system. Sufficient clearance may be allowed below the shelf 197 to let the tank be lifted clear of its evaporator units, or the shelf may be removed before removing the tank. The thermostatic control 198 is supported from the baffle 188 or otherwise attached to the removable assembly by supports not shown. It may be located flush with the shelf as shown, to form a part of the shelf surface, or it may be located below the shelf so that it can be removed with the removable assembly without disturbing the shelf. This control is thermally affected by air temperature in the cabinet and it acts to open the circuit and stop both motors of the system in the same manner as switch 77 shown in Fig. 5, which figure shows wiring diagram and refrigerant connections suitable for use in connection with Figs. 18 and 19. The operation of control 198 is such that it stops the system when the air temperature within the cabinet drops to the desired minimum, which is higher than the minimum temperature of air required to insure the freeing of ice from the surfaces upon which it has been frozen in tank 178.

The insulated sharp freezing compartment 57 is similar to the assembly of the same number shown in Fig. 1, but is here supported by the insulated wall 177 and in turn supports the evaporator and other removable parts within the cabinet by means of the supports 199, which are attached to it or to the floor of the cabinet and the sharp freezer.

The door of the sharp freezer is here shown hinged at the top, with a handle 200, so located that it extends into the space left by the inner bevel of the door 179. The shutter 140 and the baffle 159, seen more clearly in Figs. 19 and 20 are similar to like parts shown in Figs. 11, 15, 16 and 17, and the shutter is operated in a similar manner, but in this case the valve and shutter mechanism (seen in Fig. 20) is actuated by a pair of bellows which are affected by air temperature only instead of being affected by both air and refrigerant temperatures as in Figs. 11 and 15, or by evaporator temperature as shown in Fig. 10.

The mechanism for valve and shutter operation in Figs. 18 and 19 is seen in Fig. 20, which is a rear view of the tank and control mechanism. As seen in Fig. 20 the right hand bellows 201 (left hand in Fig. 19) has expanded as the result of air blown over it and the volatile fluid (not shown) which it contains. This expansion has tilted the lever 203 upward, moving the rocker 205 in a counter-clockwise direction and assisting in moving the lever 204 downward against the lesser pressure of the bellows 202, which is at this time not in the air stream and is being cooled by its proximity to the cold section of the evaporator. The arm 206, which is integral with rocker 205, is thus moved to the left as shown and its point 207 has carried the upper end of spring 208 to the left until this spring is nearly ready to snap the shaft 139 and shutter 140 in a clockwise direction in the manner described in connection with Figs. 11 and 15.

The shutter shaft also carries the arm 209 which has at its upper end the two right angular projecting lugs 210 and 211. As the shutter moves to the right (Fig. 20) through something more than half of its arc the arm 209 moves with it without acting upon any other part, but during a portion of the latter part of the shutter movement lug 210 engages arm 212 and carries it to the right, causing it to swing in a counter-clockwise direction about its pivot 213. When arm 212 has moved slightly past its midway position it is acted upon by spring 214, which is supported at its lower end by a fixed pointed member, causing arm 212 to snap farther in the same direction until stopped by the engagement of valve 215 with its seat. Meanwhile the movement of shutter and its shaft continues until the shutter is stopped by contact with the bottom of the tank 178. The space between lugs 210 and 211 is such that as these parts come to rest there will be a gap between 210 and 212 equal to the gap seen in Fig. 20 between 211 and 212, so that both the valve and the shutter are stopped independently, each by its own seat.

This movement causes refrigeration of the evaporator units that have just been warmed by the air stream and initiates the defrosting of the evaporator units which have just completed the ice-making portion of their cycle, as before described.

To remove the refrigerating system from the cabinet as shown in Figs. 18 and 19, the door 179 is opened, the door 181 is removed, and the handle 220 pulled forward, disengaging the latch 221 from its recess in rail 222 upon which the removable wall slides. Above the removable wall is a bead 223 in the liner of the cabinet. The distance between the bead 223 and the rails 222 is such that the unit base (removable wall) will slide freely after the latch is disengaged.

When the assembly is removed from the cabinet it rests upon the floor on legs 224 and 225. Legs 225 also form the support for the condenser 226. The tank 178 may be removed with the balance of the removable assembly, but is preferably removed before the main assembly and emptied of water and ice as a matter of convenience. In order to enhance the ease of removal of the assembly from the cabinet and to aid in eliminating possible damage to it during removal, the inner edge portions of the front end portions of the rails 222 are cut away to a greater width than the wall 177 to permit the wall to drop downwardly therebetween when in nearly withdrawn position. A stop 222' fixed to the bottom surface of the wall 177 adjacent the rear edge thereof moves into intersecting relation with respect to a depressible stop 222" carried by one of the rails 222 just to the rear of the cut away forward ends of the rails 222, thus preventing the assembly from inadvertently dropping down at the rear end during removal. In removing the assembly it is withdrawn until the stops 222' and 222" engage each other, the front end of the assembly is lowered until the front legs 224 rest on the floor, the stop 222" is depressed and while the rear edge of the assembly is supported the assembly is completely withdrawn and the rear legs 225 allowed to rest on the floor.

The condenser 226 is cooled by air circulation as indicated by arrows. This air circulation is directed by the baffle 227 so that part of the air flows through the duct 228 to cool the motor-compressor assembly 229. The springs 230 support the motor-compressor assembly from the removable wall in a manner to minimize transmission of vibration thereof to the cabinet.

Fig. 21 shows a construction similar to Fig. 6, with certain modifications, as described below. The motor 87 and fan 64 are mounted on the floor of the cabinet 86 and are enclosed by the baffle 251 which directs the air over the bottom of the entire water tank 62 whenever the motor 87 is operating. The upward air flow is confined by the vertical baffle 252, the side wall of the cabinet, the rear wall of the cabinet and the cabinet door, not shown, so that it first strikes the bottom of the tank and the several evaporator units and their fins and then flows upward over the tank and up the left side of the interior of the cabinet.

The support 253 supports the baffle and the spring support 254, while the latter supports the manifold tubes 43, 255 and 256 and through these tubes the evaporator assembly and the tank. The spring support 254, of which several are located throughout the length of the manifold tubes, and the manifold tubes themselves are flexible enough to allow the various evaporator units to be depressed by the weight of the tank to afford the good thermal contact before described.

The refrigerant circulatory path and control means are modified in this figure to provide a simplified method of cycling. Liquid refrigerant supplied to the pressure reducing device 40' through the tube 39 passes at reduced pressure through branch tubes on both sides of the manifold 43, hence feeds all of the several evaporator units on both sides of the tank bottom at one time. The manifolds 255 and 256 are connected without any intervening valve mechanism to the suction tube 61, which carries the vaporized refrigerant back to the motor-compressor unit 36', either directly as shown or through another evaporator as shown in other views. After compression, the refrigerant vapor passes through tube 37 to condenser 38, where it is liquefied and collected in receiver 38' preparatory to starting on another cycle as before.

This operation causes the freezing of ice rings 75 on all of the freezing surfaces in the tank at one time. When this portion of the cycle is completed the bulb 262, which is partly filled with a volatile liquid, will have dropped in temperature until the vapor pressure within the bulb, the tube 263 and the bellows 264 has fallen to the degree which allows the spring 265 to compress the bellows 264, moving the rod 266 and arm 267 to the right, as shown, where the spring 269, pivoting upon the point 268 has moved the pointed member 270 in a clockwise direction about its supporting shaft 271.

This movement brings the switch mechanism 260 to the position shown, with rocker 272 tilted to the right, closing the contact between the electrode 274 and the spring contact 277. The insulating strip 273 separates parts 272 and 274 so that current is now confined to the path leading from conductor 84 of the power supply, through switch 77 (here assumed to be closed) to motor 87 and returning over conductor 281 to binding post 279, spring contact 277, electrode 274, through flexible lead 275 and binding post 276 to the other side 85 of the power line. The binding posts, being supported by the insulating cover or base 261 of switch mechanism 260, are insulated from each other and from the metal parts of the mechanism.

In the position of the switch mechanism shown the motor 87 is operating and the motor-compressor unit 36' is idle, so that air, circulated by the fan 64, causes the ice rings 75 to melt free from the surfaces upon which they have been frozen and float upwardly in the water 74 as indicated by the floating ice rings 75. When this defrosting or melting part of the cycle is completed, having caused all of the ice rings 75 recently frozen to free themselves and float upwardly away from the surfaces upon which they were frozen, the temperature of the bulb 262 will rise, causing the bellows 264 to expand and the switch mechanism to reverse itself, opening the circuit to the motor 87 and closing the circuit through the motor of unit 36' by way of the binding post 280, spring contact 278, electrode 274, lead 275, post 276 and conductor 85 of the power line.

The energizing of this circuit starts the refrigerating process and causes new rings of ice to form on the refrigerated bands of the hemispherical surfaces of the tank bottom.

Since the freeing of ice depends upon heat absorbed from the air in the cabinet, and the cabinet is used for storage of foods which should not be frozen, it is desirable to provide a control to stop both motors at times, or to design the switch mechanism 260 with a spring 265 of such strength that the switch will not start the refrigerating system in response to such a rise of temperature of the bulb 262 as might occur when the air in the cabinet has fallen to the freezing point or nearly so.

A separate control means is shown by the thermostatic switch indicated diagrammatically at 77 and connected by means of the capillary tube 259 to the bulb 257, which is held in contact with the ice water tank 62 by the spring clip 258. This bulb, which is suitably charged with a volatile fluid, partakes of the temperatures of both the tank and the cabinet air, hence an excessive drop of temperature of either will open switch 77. This stops the refrigerating process when an excessive amount of ice has been formed in the tank, or when the cabinet air temperature has fallen to a point approaching that which might endanger the food stored in the cabinet or prevent the freeing of ice rings from the surfaces upon which they have been frozen. This subject matter of controlling the refrigerating process in response to the amount of ice formed is being claimed in the co-pending application of Glenn Muffly, Serial No. 237,629, filed October 29, 1938.

The evaporator units shown in Fig. 21 (not numbered) may be of any of the types previously illustrated, or as shown in Fig. 22 and Fig. 23 or Fig. 25. In Fig. 22 the main support 285 may also act as a baffle, while the secondary support 286 may be a solid wall, also acting as a baffle or part of an air duct. In the event that such use is made of the supports 285 and 286, the air blast will be supplied above 285 on one side of 286 and the outlet for air will be on the opposite side of 286, causing the air to flow upward on one side of 286, over the fins 288 and down on the opposite side of wall 286. It will be seen that the support 285 might replace the support 253 in Fig. 21, with an opening through the supporting wall 285 between the vertical wall 286 and another wall similar to 286 to the left of it. The parts 262 and 256 of Fig. 22 and bulb 262 in Fig. 23 will fit into Fig. 21 and show the relationship of these views.

The evaporator unit shown in Fig. 22 is supported by the spring surrounding the post 287, which is rigidly attached to the wall or support 286. It resembles other evaporator units shown herein, being supplied with low pressure liquid refrigerant through the manifold 43, which joins the semi-circular passage 170, formed between the two walls 168 and 169. Refrigerant passes upward through passages 171 to the circular passage 172 and down other of the passages 171 to the other semi-circular passage 173 and out through manifold 256.

The tube 289, which is removably telescoped over extension 290 of the ice freezing cone of tank 62, provides a guide for ice rings 75 after they have been freed to float upward in the water in the tank. This causes the upper rings of ice to be pushed above the water level by the accumulation of ice rings below them on tube 289, which may be carried above the top of the side walls of tank 62 and curved to cause ice rings to drop off into another container, such as a second tank, in which the ice may be melted and refrozen to effect a further purification and clarifying of the ice. It is a well known fact that ice is more pure than the water from which it is frozen when only a part of the water is frozen, hence when a part of the water in one tank is frozen, the ice removed, allowed to melt and part of the water refrozen, the result is ice of a considerably higher degree of purity than is obtained by filling a container with tap water and freezing it solid.

The sectional view in Fig. 23 is self explanatory since it is taken on the line 23—23 of Fig. 22 and shows no new parts. The passages 171 are more clearly shown in Fig. 23, as is the relationship of the fins and the wall 286 to the inner wall 168 of the evaporator unit.

Fig. 24 shows diagrammatically how evaporator units 45 (which may be assumed to be like Fig. 22) may be supplied with air from a centrifugal type fan, employing a shutter 81 pivoted upon a vertical axis to alternate position 81'. The housing or baffle 292 directs air over the motor 87 to the fan 291, and after the air has passed over the evaporator units on one side it exhausts upwardly or downwardly as the case may be.

Another method of arranging the fins and the baffle is shown in Fig. 25, where the parallel fins 296, 297 and 298 are attached to a heavy inner wall 294 of the evaporator space 295. The wall 294 is preferably made of copper or other metal having a high thermal conductivity and is thick enough to provide ample heat conductivity from the fins to the outer wall 293, which contacts the tank 62.

The baffle 159' is similar to baffle 159 seen in Figs. 16, 17 and 20, but it is flat on top of its ridge running centrally under each row of evaporator units, since the fins fill the space above it nearly enough to insure that air will pass over or very near to a fin. While the most of the weight of tank 62 and its contents rests upon the springs 49, it also contacts the soft strips of felt or other suitable material 299 to stop air leakage between the tank bottom and the top of baffle 159'.

The post 165 is soldered or otherwise attached to the two middle fins 296 and fits loosely in baffle 159', being secured against lifting out when the tank is removed by means of a snap ring 167, a cotter pin or other suitable retainer.

A slightly modified construction, showing other features of my invention, is shown in Fig. 26, where the cabinet 301 resembles the construction shown in Fig. 1 except that the removable top unit is not shown. The door 302 is similar to the door 33 of Fig. 1, except that its lining is fitted with a depressed section to clear the water faucet and arranged to conduct any drippage from this faucet into the pan 79.

The water and ice tank 303 is of a modified form, having flat ice-making surfaces which will be explained in connection with the following views. Below the tank is a longitudinal passage 304 for incoming air between the two rows of parallel fins 305, which are attached to and support (by means of central fin 305' of each evaporator unit) the several evaporator units 306. The housing 334 surrounding the fan 291 (Fig. 26) connects with the passage 304 below the tank and between the fins of the two rows of evaporating units. Air is blown over the fins, giving up heat to them to melt the ice free and to cool the air within the cabinet. The air, after passing either way between the fins, is directed upward along the two sides of the tank by the baffle 310.

The auxiliary baffle 335 below the low pressure liquid manifold 43 prevents the incoming air from the fan from contacting cold surfaces and losing its heat before it reaches the fins.

Each of the evaporator units 306 as shown in Figs. 29, 30 and 31 comprises an outer sheet 307 and an inner sheet 308. The fins are preferably of copper, or other metal having a high thermal conductivity, as are the sheets 307 and 308 to which they are soldered or otherwise attached in good thermal relationship. The middle fin 305' of each evaporator unit is longer at its bottom than the other fins of the same unit, so that the long fin of each evaporator unit rests upon one of the curved ribs seen at each of the two longitudinal sides of the spring baffle 309, which is in turn attached to and supported by the main baffle pan 310. The pan 310 and the sharp freezer 57 are supported by straps 80 in previous views. Thus the water-ice tank 303 is supported by the evaporator units 306, spring baffle 309, main baffle 310 and finally by the straps 80, the tank bottom contacting only the outer sheets 307 of the several evaporator units 306 on their flat outer surfaces.

The two rods 311, which are removably secured in the pan 310, pass through the fins 305 and 305', anchoring them to the pan 310 without preventing each evaporator unit from moving slightly, independently of the other units, to adjust its outer wall to the ice-making walls 312 of the tank. It will be seen that each evaporator unit is free to rock sidewise upon the spring baffle 309 (Fig. 29), and if it bears more than its share of the weight of the tank 303 and its contents the fin 305' depresses the spring baffle at its point of contact, thus insuring that each of the evaporator units 306 will make good thermal contact with the tank on both sides of the inverted V into which it fits.

The ice blocks 313 are consequently frozen uniformly, one on each side of the V on inner surfaces of wall sections 312. Refrigerant is supplied by a system as illustrated in Fig. 21 to the pressure reducing device 40' (Fig. 29), from which the low pressure liquid passes through the manifold 43 to the space 314 of each evaporator unit. After partially evaporating in this space, the refrigerant passes through the port 315 (Fig. 30) to the space 316 of the evaporator unit and finally out through one of the manifolds 255 or 256 to the sharp freezer and then to the suction side of the compressor of motor-compressor assembly 36' as explained in connection with previous views.

Electric current is supplied over wires 84 and 85 as shown before, but the circuit is modified somewhat to accommodate the lamp 321, which is automatically lighted when the door is opened, stopping fan motor 87 at the same time in case it is running. This operation will be understood by tracing wire 317 from line wire 85 to the door switch 318, which is arranged to connect wire 317 with wire 319 (as shown in Fig. 26) when the door is closed, and with wire 320, leading to the lamp 321, when the door is open. Since wire 322 leads from the other side of the lamp back to line wire 84, the lamp will always be energized when the door switch operates to energize wire 320.

The rod 323 is pushed inwardly, compressing spring 324, when the door is closed. This rod is connected with rod 325 of the switch, which in turn actuates the insulating swinging arm 326 carrying the contact 327, to which wire 317 is connected. When the door 302 is closed the contact 327 is pushed against spring contact 328 connected with motor 87, and when the door is opened the spring 324 actuates rod 323 and thereby rod 325, causing contact 327 to engage spring contact 329, which is connected to the lamp 321. This arrangement insures that the lamp will light whenever the door of the cabinet is opened, and it also insures that the fan 291 on shaft of motor 87 will be idle while the cabinet door remains open. By stopping the forced air circulation while the cabinet door is open, I avoid excessive interchange of air between the interior and the exterior of the cabinet. In case the fan motor is not running when the cabinet door is opened the opening of its circuit will produce no effect. The circuit to the motor which drives the compressor is independent of the door switch, so that the opening of the door will not affect the operation of the compressor. Should switch 260 act to stop the compressor while the door is open it will not start the fan, but the fan will then start upon closing of the cabinet door.

Switches 77 and 260 are connected for thermostatic operation as shown in Fig. 21 and act in the same manner, except that the door switch modifies such operation of the fan motor and provides for automatic operation of the lamp.

The tank 303 is divided longitudinally by the wall 330, which stops short of the top of the tank, as seen in Figs. 27, 29, 33 and 34. Attached to one side of this dividing wall is the sheet 331, forming the overflow return duct 332, which is connected to port 333 through the wall 330. The purpose of this return duct is to allow water from the bottom of the tank on the right hand side of the wall 330 to flow through the wall to the left hand side of the tank whenever the level of water on the right hand side of the wall rises to the level of port 333. The level of water on the right hand side of the wall is raised by shifting of ice from the left side to the right side of wall 330, which shifting is accomplished automatically as later described.

A faucet 336 is located on the right side of the wall 330, so that drinking water is normally used from this side only. This is done because the operation of the system purifies the water on the right hand side of the wall, as hereinafter described.

The faucet 336 is provided with the valve 337, (Fig. 28), held closed by spring 338 and opened by arm 339, which is actuated by movement of arm 340. The arm 340 may be moved by hand or by pushing a drinking glass, pitcher or other receptacle against it to draw off the cooled and purified water. Another faucet may be provided if desired for drawing off water from the left side of the tank, which is the side into which tap water is normally poured to fill the tank.

The ice frozen on surfaces 312 in the left hand side of the tank will be more nearly pure than the water from which the ice is frozen, because of the well-known fact that the process of freezing cause the precipitation or concentration of minerals and other impurities from the freezing water into the unfrozen water, hence when only part of the water in a container is frozen the ice produced will be purer than the water was to start with and considerably purer than the water remaining unfrozen.

I have, therefore, provided means for moving the ice from the left hand side of the tank to the right hand side of the tank at each cycle of operation. This ice is constantly melting in the right hand side of the tank, where the water level is being raised at each cycle by the dumping of additional ice into the water already there. When the water level on the right hand side of the wall rises to the level of the port 333 some of the water from the lower portion of the right hand compartment will flow up through the passage 332 and spill over into the left hand side of the tank.

The water spilled over from right to left comes from near the bottom of the tank, where impurities will have been collected by virtue of the greater density of water carrying salts and minerals and because this region of the tank is adjacent to the freezing surfaces, where impurities are being forced out of the water that is in process of freezing. The water near the top of the right hand side of the tank will be mainly water recently melted from the floating ice, to which more ice is constantly being added at short intervals.

Fresh water is added to the left side of the tank whenever the level is observed to be low, while ice and water are used from the right hand side of the tank. The user will periodically lift the tank off of the evaporator units, remove it from the cabinet, empty the water and refill the left side with tap water. The ice and pure water from the right hand side of the tank are preferably retained and replaced in the tank.

In the case of water containing desirable minerals the user may wish to keep the water from the left side of the tank where these minerals are concentrated. For such use the faucet may be located at the left of the wall.

The automatic moving of ice from the left to the right side of the tank is accomplished by means of the tilting rack 351, seen in Figs. 34 and 38, which is actuated by the bellows 368, seen in Figs. 26, 32 and 33. Variations in pressure in the high pressure side of the refrigerating system are employed to actuate the bellows in synchronism with the ice-making cycles.

The tilting rack 351 is secured to the shaft 352, which is journaled to the tank and extends at the rear to the mechanism seen in rear view 32. The outer edge of rack 351 carries a number of hinged sections 353, which may be hinged downwardly against the action of springs 355, which are stopped by the hinge rod 354 from pushing the hinged sections 353 beyond the plane of the main portion of rack 351. The hinged sections are, however, free to swing upwardly without aid or resistance from the springs.

This action is illustrated by Fig. 34, where the rack 351 and hinged sections 353 are seen at rest in their normal position against the wall 330. When rack 351 is moved upward by rotation of shaft 352 the hinged portions strike the wall of the tank and are thereby caused to swing downward or lag behind the movement of rack 351 as indicated at 353'. At the extreme upward position of rack 351 the hinged portions clear the wall and are snapped upward to position indicated by dotted lines next to the top of the tank in Fig. 34. On the downward movement of rack 351, which is produced by gravity, the hinged sections strike the wall of the tank and swing upward relative to the rack, lagging behind it as shown by 353'' in Fig. 34.

The power for swinging the rack upward is obtained from the compressor by means of the tube 363, which is connected to the liquid line at a point ahead of the expansion device 40'. The pressure effective upon the bellows to expand it rises quickly each time that the compressor starts and falls to a very low minimum soon after the compressor has stopped, due to the passage of liquid through the capillary restriction device 40' into the cold side of the system, where the warm liquid assists in melting ice free.

The bellows 368 is expanded by the rise of pressure when the compressor starts, stretching the spring 361 and moving the lever arm 358 about its pivot 364 until it strikes the stop 366 at the upper limit of its travel. The hinged end 357 on arm 358 engages cam arm 356, which is rigidly attached to shaft 352, on its upward movement, thus causing the rack 351 to swing upward until the cam arm 356 and the hinged end 357 pass beyond their respective arcs of engagement with each other, at which point the cam arm 356, shaft 352 and rack 351 are returned by gravity to their original position as seen in solid lines in Fig. 34.

Since the control 260 is so adjusted that the compressor does not start until after a rise of temperature which insures that all of the ice has melted free and is floating, the rack 351 is timed to swing upward soon after the ice has floated up to the surface of the water, there being no accumulation of ice in the left hand side of the tank to prevent the newly made ice from reaching the surface. The rack rises, lifting the ice with it until the ice slides off into the right hand side of the tank (seen as the left hand side in the rear view Fig. 34). The arm 358 remains in the raised position during the running period of the compressor, during which time ice is forming, and drops when the compressor has stopped and the high side pressure dropped.

As the pressure drops the spring 361 pulls the arm 358 down, compressing the bellows until the hinged end 357 strikes the angular surface on 356 (Fig. 37) and snaps over it to the original position as shown by full lines in Fig. 32.

Figures 35 and 36 show details of the hinge between parts 357 and 358, which are pivoted together by pin 359 and urged toward the straight position (full lines in Fig. 35) by the spring 360.

Formal changes may be made in the specific embodiments of the invention described without departing from the spirit or substance of the broad invention, the scope of which is commensurate with the appended claims.

What is claimed is:

1. In combination, a set of ice-making surfaces, means for refrigerating said surfaces, air circulating means for warming said surfaces, and cyclic means for controlling said refrigerating and air circulating means to produce alternating periods of freezing and melting conditions on said surfaces, and power means operable to actuate said cyclic means at periodic intervals.

2. In combination, a refrigerating system, a cabinet cooled by said system, an automatic harvesting ice maker within said cabinet operated by said system, and air circulating means within said cabinet for transferring heat to said ice maker to assist in harvesting ice and absorbing heat from said air to cool the interior of said cabinet.

3. In combination, a water tank, means for refrigerating a submerged wall of said tank to form ice thereon, means for circulating air in thermal relation to said wall to melt ice free from said wall, and automatically operable means for alternately rendering both said means effective and ineffective for the purpose described.

4. In combination, a water container, automatically operating means for intermittently refrigerating a submerged surface of said container to intermittently cause water to be frozen thereon, and means automatically operable during periods when the first mentioned means are inactive to cause air to be circulated in thermal relation to said surface to aid in releasing ice therefrom.

5. In an ice making apparatus, in combination, refrigerating means for forming ice upon a surface, air flow means for transferring heat to said surface to free ice therefrom, and automatically cycling means for causing said refrigerating means and said air flow means to act alternately to transfer heat from and to said surface.

6. In combination, a refrigerating system, an automatic ice maker operated thereby, a valve controlling the effect of said system on said ice maker, means for causing air flow over a part of said ice maker, and automatically cycling means for actuating said valve and for controlling said air flow.

7. In combination, a refrigerating system, a water tank having a plurality of its wall areas intermittently cooled by said system to form ice thereon, air flow means for intermittently warming said areas, and thermostatic means for initiating a cooling period on certain of said surfaces in response to a rise of temperature adjacent to said surfaces and to initiate a warming period on said surfaces in response to a fall of temperature such as occurs after the desired thickness of ice has been frozen on the surfaces.

8. In combination, a refrigerating system, a cabinet, a tank within said cabinet adapted to contain water, heat transfer means associated with said tank and cooled by said system for the purpose of freezing water and forming small blocks of ice on an inner wall of said tank, air circulating means for causing air within said cabinet to circulate over said heat transfer means, and automatically operable means for causing said refrigerating system and said air circulating means to act alternately upon said heat transfer means to form said ice blocks and then free them by partially melting them so that they will float away from said wall in the water in said tank while more ice is being formed thereon.

9. In combination, a water container, means for refrigerating a wall of said container to cause ice to form thereon, means for warming said wall to free said ice therefrom by circulating air in thermal relation thereto, and thermostatic means operable by temperature conditions of said wall for simultaneously alternating the effects of the first two mentioned means on said wall.

10. In combination, a refrigerating system, an ice maker refrigerated thereby, a pair of heat transfer units in said ice maker, an air duct leading to each of said units, ports for admission of air to each of said ducts, a shutter for closing said ports so constructed and arranged as to direct air flow over one unit at a time, valve means for controlling the refrigerating effect of said system to refrigerate said units alternately, and control means so constructed and arranged that it will automatically actuate said shutter and said valve means periodically to effect refrigeration of one unit while air is stopped from flowing over said unit and is directed over the other unit, and then at the end of this portion of the cycle to automatically and substantially simultaneously move said shutter and said valve means to cause air flow over the first unit while the second unit is refrigerated, and to repeat this cycle of operation.

11. In combination, a refrigerator cabinet, ice making means in said cabinet, a refrigerating system for refrigerating said ice making means, means for circulating air in thermal relation with respect to said ice making means to aid in melting ice free therefrom and to cool said cabinet thereby, automatically operable means for alternately rendering said system and said air circulating means effective for the purpose described, and automatically operable means for stopping operation of said system when the air in said cabinet is reduced in temperature to a predetermined value.

12. In combination, a refrigerator cabinet, ice making means in said cabinet, a refrigerating system for refrigerating said ice making means, means for circulating air in thermal relation with respect to said ice making means to aid in melting ice free therefrom and to cool said cabinet thereby, automatically operable means for alternately rendering said system and said air circulating means effective for the purposes described, and automatically operable means for stopping operation of said system when the air in said system approaches a temperature value at which said air circulating means is rendered ineffective for the purpose of aiding in melting ice free from said ice making means.

13. In a refrigerating mechanism, in combination, a pair of evaporator units, two thermally responsive elements, each thermally associated with a different said evaporator unit, a part common to both elements and movable thereby in one direction when one of said elements is the warmer and movable thereby in the opposite direction when the other of said elements is the warmer, a spring snap mechanism actuated by said part, valve means actuated by said snap mechanism, and air shutter means actuated coincidently with said valve means, each of said means having an independent stop at a closed position.

14. In combination, a water tank, a refrigerant evaporator contacting a wall of said tank, said evaporator including a pair of walls secured together to form a chamber therebetween and contacting said wall of said tank at points on its outer surface corresponding to points of contact between said pair of walls, and heat interchange fins secured to said evaporator at points on its opposite outer surface corresponding to said points of contact.

15. In combination, a refrigerant evaporator, means for circulating air, a water tank removably associated with said evaporator, and a baffle for directing said air into contact with said evaporator and for guiding said tank in its movement toward and from said evaporator.

16. In a refrigerating mechanism, in combination, a pair of evaporators, means for refrigerating either one of said evaporators but not both simultaneously, means for circulating air over either of said evaporators but not both simultaneously, two mechanically opposed, thermally responsive members, one under the influence of the temperature of air leaving one of said evaporators and one under the influence of refrigerating effect on the other of said evaporators, and an operative connection between said members and both said means to effect cyclic and alternate operation of both said means.

17. In a refrigerating mechanism, in combination, a water tank, a plurality of evaporator units for independently contacting said tank, a separate pivotal support for each evaporator unit, and a spring associated with each said support so that said units will adjust themselves to and resiliently engage their respective contact surfaces on said tank.

18. In a refrigerating mechanism, in combination, an evaporator, a water tank removably supported by said evaporator, heat interchange fins on said evaporator, and means engaging said fins to support said water tank.

19. In a refrigerating mechanism, in combination, a plurality of evaporator units, a baffle for directing a flow of air with respect to said units, and spring means carried by said baffle supporting said units.

20. In a refrigerating mechanism, in combination, a plurality of evaporator units each having a surface representing a portion of a sphere, and a water tank removably associated with said units and having a corresponding number of surfaces complementary to said surfaces of said units, said units being resiliently urged into interengagement with said tank.

21. In a refrigerating mechanism, in combination, a refrigerating system, a cooling unit operated by said system, and an ice and water tank removably associated with said cooling unit, said cooling unit being so flexibly mounted and arranged that it is contacted and moved by said removable tank when the tank is replaced in its operating position after having been removed, and said tank having a surface thereon representing a portion of a sphere so located that it contacts a mating surface on said cooling unit.

22. In a refrigerating mechanism, in combination, a refrigerating system, a container for water to be frozen by said system, a source of electric current, a circuit supplying energy to said system for producing a refrigerating effect thereby to freeze said water, ice melting means, a circuit supplying energy for activating said ice melting means to melt said ice free from the surface of said container upon which it has been frozen, and automatically operable switching means for connecting said source of electric current alternately to the two said circuits.

23. In a refrigerating system, in combination, a refrigerating system, an ice maker operated thereby, a water tank associated with said ice maker for the purpose of forming ice upon an inner wall of said tank, air circulating means for causing ice thus formed to melt free from said wall, an electric motor for operating said refrigerating system, an electric motor for operating said air circulating means, switch means for alternately closing power circuits to said motors to operate one of them at a time, and automatically cycling means for actuating said switch means.

24. In an automatic ice maker, in combination, a pair of electric current consuming devices of which at least one performs a function in the operation of said ice maker, a power circuit, switching means for connecting said circuit to said current consuming devices, and a thermally responsive device connected to said switching means to cause it to energize one of said devices in response to a rise of temperature and to energize the other of said devices in response to a fall of temperature.

25. In an automatic ice maker, in combination, means for forming ice upon a surface, means for melting said ice free from said surface, automatically operable control means for producing cyclic operation of the two first said means, the first said means comprising an evaporator element with means for causing a volatile liquid to evaporate therein and the second said means comprising surface heat transfer means for picking up heat from air.

26. In a refrigerating mechanism, in combination, a refrigerator cabinet, a refrigerating system, an automatic ice maker in said cabinet operated by said system, an electric motor within said cabinet, air circulating means driven by said motor, and air duct means for directing air flow over said motor and thence over a portion of said ice maker.

27. In combination, a cabinet, an automatic ice maker therein, a refrigerating system arranged to cool said ice maker, a compressor in said refrigerating system, a fan supplying air to said ice maker, and thermostatic control means responsive to a rise of temperature of said ice maker to start said compressor and stop said fan and responsive to a fall of temperature to stop said compressor and start said fan.

28. In combination, a cabinet, an automatic ice maker therein, a refrigerating system arranged to cool said ice maker, a compressor in said refrigerating system, a fan supplying air to said ice maker, thermostatic control means responsive to a rise of temperature of said ice maker to start said compressor and stop said fan and responsive to a fall of temperature to stop said compressor and start said fan, and additional thermostatic means to stop said compressor in response to a drop of air temperature in said cabinet and the restart of it in response to a rise of said air temperature.

29. In a refrigerating mechanism, in combination, a plurality of evaporator units, a water and ice tank resting upon said evaporator units, a baffle so constructed and arranged as to deflect air into heat exchange relationship with said evaporator units, and air moving means for causing air to flow past said baffle.

30. An automatic ice maker including, in combination, a tank in which ice is frozen and then stored by floating in water after it has been freed from the surface upon which it was frozen, said tank having a V shaped wall section, a V shaped evaporator unit contacting said wall section of the tank, supporting means for said evaporator section allowing it freedom of movement to insure good thermal contact between the two sides of the evaporator and the two sides of the wall section, and means for periodically refrigerating and warming said evaporator section in an alternating cycle.

31. In combination, a water tank, a refrigerant evaporator contacting the wall of said tank, said evaporator including a pair of walls secured together to form a chamber therebetween and providing a plurality of separated areas of contact with the outer surface of said tank, and heat interchange fins secured to said evaporator on its opposite outer surface.

32. An ice maker comprising, in combination, an insulated chamber, a water container in said chamber, means for effecting refrigeration of at least a portion of a wall of said container whereby to cause at least a portion of the water contacting said wall to form into ice, and air circulating means operable after said ice has been formed to melt said ice from said surface and to cause heat to be absorbed from the air in said chamber whereby to cool the air in said chamber.

33. The method of producing a supply of ice by means of a tank containing water, refrigerating means, heating means, and power means to control operation of said refrigerating means and heating means, including the steps of operating said refrigerating means to refrigerate separated areas of a submerged wall of said tank, effecting operation of said power means to discontinue refrigeration of said areas when a layer of ice of desired thickness has been formed thereon and simultaneously applying the effects of said heating means to said areas to melt said ice free therefrom, and continuously repeating said steps of operation in the sequence stated.

34. The method of producing a supply of ice in an insulated cabinet by means of a tank in said cabinet containing water, including the steps of refrigerating separated areas of a submerged wall of said tank, discontinuing said refrigeration of said areas after a predetermined period of refrigeration thereof sufficient to cause a layer of ice to be formed over each of said areas but insufficient to cause said layers to join one another, then applying heat to said areas to melt said ice free therefrom and simultaneously withdrawing heat from the air within said cabinet, and continuously repeating said steps of operation in the sequence stated.

GLENN MUFFLY.